(12) United States Patent
Schmitz

(10) Patent No.: US 7,671,322 B2
(45) Date of Patent: Mar. 2, 2010

(54) OPTOELECTRONIC SECURITY SYSTEM FOR OBJECT DETECTION IN A MONITORED ZONE

(75) Inventor: Stephan Schmitz, Freiburg (DE)

(73) Assignee: Sick AG, Waldkirch (DE)

( * ) Notice: Subject to any disclaimer, the term of this patent is extended or adjusted under 35 U.S.C. 154(b) by 21 days.

(21) Appl. No.: 11/903,803

(22) Filed: Sep. 25, 2007

(65) Prior Publication Data
US 2008/0087798 A1 Apr. 17, 2008

(30) Foreign Application Priority Data
Sep. 29, 2006 (EP) .................. 06020635

(51) Int. Cl.
*H01J 40/14* (2006.01)
(52) U.S. Cl. .................. 250/221; 250/559.12
(58) Field of Classification Search .............. 250/221, 250/551, 559.12, 559.11, 559.19; 340/555–557, 340/815.4–815.46
See application file for complete search history.

(56) References Cited

U.S. PATENT DOCUMENTS 5,266,810 A * 11/1993 Murphy .................. 250/559.24
6,023,335 A 2/2000 Wustefeld
2005/0017157 A1 1/2005 Emmanuel

FOREIGN PATENT DOCUMENTS

| DE | 19608391 | | 9/1997 |
|---|---|---|---|
| DE | 10231178 | | 2/2004 |
| DE | 29724912 | U1 | 2/2006 |
| EP | 0875873 | | 11/1998 |
| FR | 2725817 | | 4/1996 |

OTHER PUBLICATIONS

European Search Report dated Mar. 14, 2007 relating to European Patent Application No. 06 020 635.6-2215, 3 pages.
Translation of European Search Report dated Mar. 14, 2007 relating to European Patent Application No. 06 020 635.6-2215, 4 pages.

* cited by examiner

*Primary Examiner*—Que T Le
(74) *Attorney, Agent, or Firm*—Harness, Dickey & Pierce, P.L.C.

(57) ABSTRACT

An optoelectronic security system includes a plurality of light transmitters in a light grid arrangement for the transmission of light signals into a monitored zone, at least one spatially resolving light reception unit for the reception of the light signals transmitted by the light transmitters and a read-out circuit for the reading out of the signals of the at least one light reception unit. The optoelectronic security system has an evaluation device which is configured such that it can split the surface of the at least one light reception unit into at least two processing regions in dependence on a predetermined selection criterion and can further process the signals of the at least two processing regions differently.

17 Claims, 1 Drawing Sheet

OPTOELECTRONIC SECURITY SYSTEM FOR OBJECT DETECTION IN A MONITORED ZONE

FIELD

Figure 1:
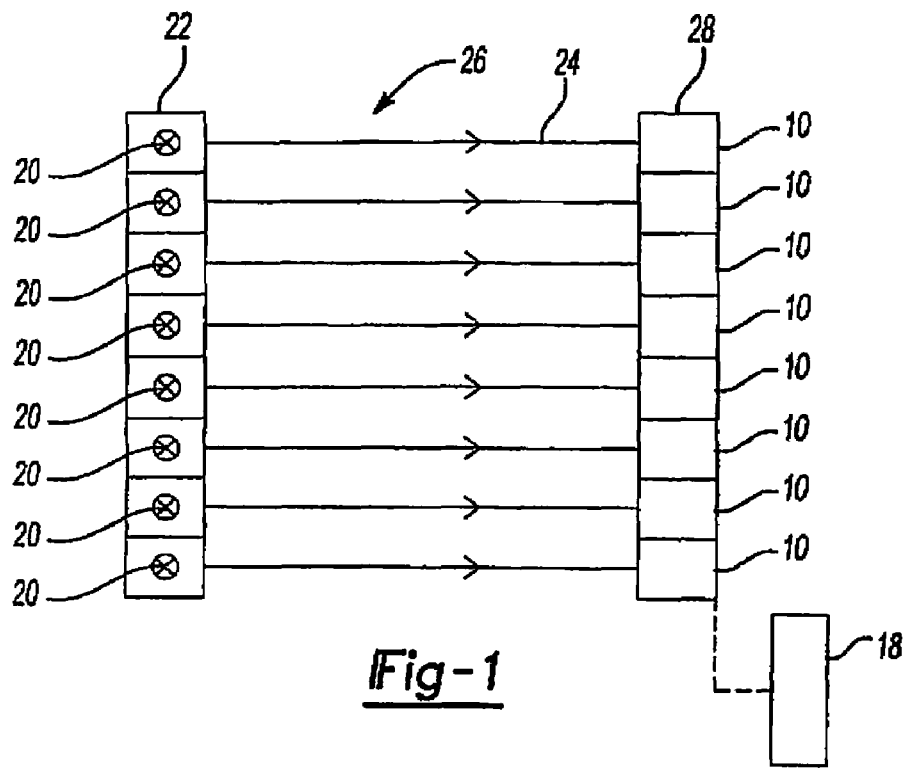

The invention relates to an optoelectronic security system comprising a plurality of light transmitters in a light grid arrangement for the transmission of light signals into a monitored zone, at least one spatially resolving light reception unit for the reception of the light signals transmitted by the light transmitters and a read-out circuit for the reading out of the signals of the at least one light reception unit. The invention furthermore relates to an alignment method for such an optoelectronic security system and to a method for its operation.

BACKGROUND

Such monitoring units are used e.g. for the monitoring of hazardous machine working zones. If an object moves into the monitored zone and thus into the light path between the light grid and the light receiver, an object detection signal is generated which results, for example, in the switching off of the machine or in the triggering of an acoustic or visual signal.

Not only articles are termed an "object" in the present text, but also and in particular body parts, e.g. of machine operators.

A monitoring unit is described in EP 0 875 873 B1 in which a spatially resolving receiver element is used, e.g. in the form of a photodiode matrix. The desired position of the light spot generated at the light receiver by the light transmitter is taught and stored in a teaching process at the location of use. During monitoring operation, the measured signal is compared with the stored desired signal to detect a deviation when e.g. an object is located in the light path and effects a shadowing.

Under unfavorable operating conditions, it can occur that an object in the monitored zone is "reflection bypassed" by reflections of the measured light at reflecting objects, e.g. in the marginal region of the monitored zone and that nevertheless a signal is measured at the position of the light receiver at which the shadowing of the measured light by the object would occur. To prevent this erroneous measurement, in the known solution, the whole area of the spatially resolving detected is read out, that is e.g. all the individual elements when a photodiode matrix is used. The risk of an erroneous detection due to reflection bypass can be reduced by a spatially resolved comparison of the total receiver surface with the expected signal.

In this respect, it is necessary with the known solution for the avoidance of such erroneous detections to read out the total receiver surface, that is e.g. all the photodiodes of the photodiode array of the receiver. This results in a high evaluation time.

DE 102 31 178 A1 describes an optoelectronic sensor in which the light of an individual light source is sent in the direction of a reflection element and moves from there to a light receiver. The received signals of individual receiver elements of a photodiode array are associated with different processing devices with the help of a switch matrix.

An optoelectronic security system having the features of the preamble of claim 1 is known from EP 0 875 873 B1.

SUMMARY

It is the object of the present invention to provide an optoelectronic security system, an alignment system for such an optoelectronic security system and a method for its operation which permit a fast evaluation at high sensitivity and safety.

This object is satisfied by an optoelectronic security system having the features of claim 1, an alignment method for an optoelectronic security system in accordance with the invention having the features of claim 10 and a method of operating an optoelectronic security system in accordance with the invention having the features of claim 14. Dependent claims are directed to preferred embodiments.

An optoelectronic security system in accordance with the invention is characterized by an evaluation device which is configured to split the surface of the at least one light reception unit into at least two processing regions in dependence on a predetermined selection criterion and to further process the signals of the at least two processing regions differently. It is thus possible that different regions of the light reception unit are treated differently. Signals from a receiver region in which a light signal is expected from a light transmission unit can e.g. be evaluated differently than signals from regions of the reception unit at which no signal would be expected as a rule. It is thus e.g. possible to fix the evaluation accuracy differently. Possible selection criteria are e.g. the expected position of a light spot, the rim of an expected light spot, the size of an expected light spot or reception regions to be considered as particularly critical due to the conditions of use. The evaluation unit can, for example, include a microprocessor or a correspondingly adapted ASIC assembly.

The evaluation effort can be adapted to the circumstances and optimized by the selection of reception regions to be further processed differently.

A spatially resolving light reception unit to be used in accordance with the invention can e.g. include a one-dimensional or two-dimensional photodiode matrix which is preferably configured with CCD elements in a matrix arrangement. The read-out circuit is then connected to the individual elements of the photodiode matrix. In an advantageous further development, the evaluation device is configured such that it associates the individual elements of the photodiode matrix with the different processing regions in dependence on the predetermined selection criterion.

In such a configuration, the evaluation unit advantageously comprises a summing unit which can add the signals of the elements of the photodiode matrix associated with a processing region to a region signal. With such an embodiment, the signals of the individual processing regions are therefore respectively combined to form a region signal such that the number of the signals to be evaluated reduces significantly and a pronounced shortening of the evaluation time results to this extent. The current signals of the photodiodes of the photodiode matrix associated with a processing region are e.g. in particular added to a total current forming the region signal. The further processing of the region signals, e.g. by comparison with other region signals, is in addition very much simpler and more reliable than the further processing of the signals of individual photodiode elements since the region signals have a larger absolute magnitude.

In another embodiment, the at least one light reception unit of the optoelectronic security system in accordance with the invention includes a position-sensitive detector (PSD). Such a PSD element is an electrooptical element with a light-sensitive surface, with the detector, for example, delivering two currents from whose amplitude ratio a conclusion is drawn on the position of a light spot on the light-sensitive surface of the PSD with respect to a dimension. For such an embodiment, the evaluation device is advantageously equipped with an adding/integrating unit which can add/integrate the signal of a processing region over its surface to form a region signal.

Region signals are therefore also formed in this embodiment which permit a simple further processing.

In embodiments which include an evaluation device for the formation of region signals, the evaluation device can advantageously have a comparator device to compare the region signals of individual processing regions with one another. A reliable conclusion can then be drawn on a deviation from an expected desired value for this comparison from the comparison result. On a deviation, a warning signal can e.g. then be output from the evaluation device or a machine can be stopped.

Optionally, the region signals of different processing regions can be treated with different weighting factors to permit an ideal adaptation to the respective operating conditions.

The optoelectronic security system in accordance with the invention has a plurality of light transmitters to ensure a spatially extended monitored zone. An embodiment has a spatially resolving light reception unit which corresponds with each light transmitter and, said light reception units being equipped with an evaluation device configured in accordance with the invention for the formation of at least two processing regions in each case. Alternatively, an evaluation device can be used for the evaluation of all spatially resolving light reception units.

In another embodiment, a common spatially resolving light reception unit is provided which can preferably detect the light spots of all light transmitters of the light grid arrangement.

An alignment method in accordance with the invention serves for the alignment of an optoelectronic security system in accordance with the invention during an alignment phase, that is in particular after its installation at the monitored region to be secured.

Light signals of the light transmitters of the light grid arrangement are sent into the monitored zone without interference objects in the monitored zone. Different processing regions are fixed at the respective light reception unit in dependence on the position and/or the shape and/or the surface of the light signals received at the light reception unit or at the light reception units.

In particular e.g. those parts of a spatially resolving light reception unit can be associated with a common processing region on which a light signal of a light transmission unit are incident. The other parts of the respective light reception unit are e.g. combined to form a second processing region.

Another embodiment of the alignment method provides e.g. that those parts of a light reception unit are associated with a common processing region which surround or bound a light signal of a light transmission unit.

In another embodiment, the processing regions are selected such that they correspond to different acceptance angles of the light reception unit, that is a processing region is in particular part of another processing region. If a switch over is then carried out between the different processing regions in the monitoring, the acceptance angle of the light reception unit can be selected according to the demand. A processing region can thus e.g. be selected with a larger surface which corresponds to an acceptance angle of e.g. 5 degrees, whereas another smaller processing region is selected such that it corresponds to an acceptance angle of 2.5 degrees.

A monitoring method in accordance with the invention is carried out with an optoelectronic security system in accordance with the invention which was aligned using an alignment method in accordance with the invention. In the monitoring phase, light signals are transmitted using the light transmitters into the monitored zone in the direction of the at least one spatially resolving light reception unit. The signals of the processing regions fixed during the alignment phase using the alignment method in accordance with the invention are used to determine whether an object is in the monitored zone or not.

In an advantageous embodiment of the method in accordance with the invention, the light signals from a respect processing region are summed or are integrated over the surface of the respective processing region to form a region signal of the respective processing region. The region signals of individual processing regions formed in this manner can then e.g. be compared. In other embodiments, relationships or differences of the region signals of individual processing regions are formed for evaluation. Optionally, the region signals can be weighted differently before the difference formation or the ratio formation.

The invention also includes embodiments of the system and of the methods in which a processing region is wholly or partly part of another processing region.

BRIEF DESCRIPTION

The invention will be explained in detail with reference to the enclosed Figures.

Figure 2:
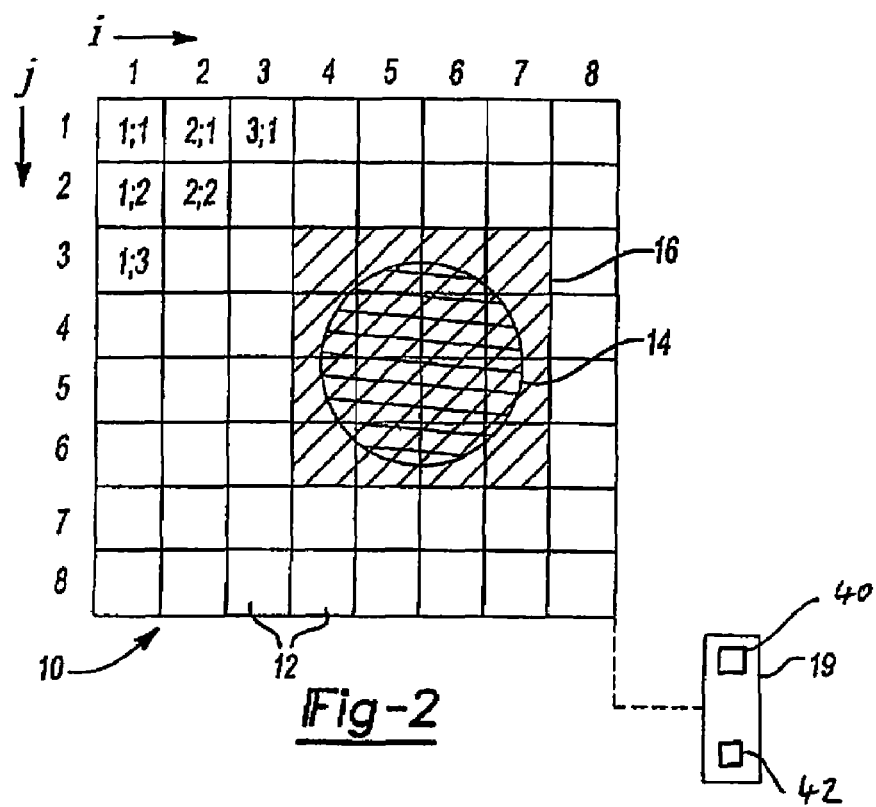

FIG. 1 shows a security system in accordance with the invention in a schematic representation; and FIG. 2 shows a spatially resolving light reception unit in a schematic representation during the operation of an optoelectronic security system in accordance with the invention.

DETAILED DESCRIPTION

FIG. 1 shows a light grid arrangement in accordance with the invention. A plurality of light sources, e.g. light emitting diodes 20, are arranged in a light transmission module 22. Corresponding optical systems form light rays 24 transmitted from the light emitting diodes in the direction of the receiver units 10 of a receiver module 28. An extended zone 26 is monitored in this manner. The individual light reception units 10 are spatially resolving light reception units such as will be described in the following with respect to FIG. 2.

FIG. 2 shows a matrix-like arrangement of individual photodiode elements 12 of which only two are provided with reference numerals by way of example.

For simpler identification, the individual photodiode elements 12 are marked by indices (i; j). Rows of eight photodiode elements are provided in the example shown in both the horizontal direction and in the perpendicular direction. An arrangement is shown with rectangular photodiode elements, with other shapes, e.g. square elements, also being possible. The photodiode surface is designed as an 8×8 matrix. The invention is, however, not restricted to this dimension.

A light transmission unit corresponding to a light emitting diode 20 and not visible in FIG. 2 transmits a light signal in the direction of the light reception unit 10, said light signal forming a light spot 14 on the light reception unit. In a manner still to be explained, the diode elements disposed in the region 16 are combined to form a processing region during an alignment phase. For the reading out and evaluation, the photodiode elements 12 are connected to an individual reading out and evaluation device 19 which is termed an evaluation device for the sake of simplicity in the following and is part of the total evaluation unit 18 shown in FIG. 1.

The optoelectronic monitoring unit is installed such that light can be transmitted from the light grid arrangement 22 through the monitored zone 26 to the light reception unit 28. As shown, the light reception unit 22 can be arranged on the oppositely disposed side of the monitored zone 26 or on the same side as the light grid arrangement when the monitoring light is reflected by a reflector at the oppositely disposed side of the monitored zone.

The light of the light grid arrangement is imaged onto the spatially resolving light reception units 10 during an alignment phase without interference objects in the monitored zone 26. This is shown in FIG. 2 for the example of one of the light reception units 10. The circular light spot 14 on the photodiode array 10 serving as a light receiver unit is shown. During the alignment phase, the evaluation unit 18 determines which photodiodes 12 are associated with which processing region. In the example shown, it is selected as the selection criterion whether the light spot 14 is incident on the corresponding photodiode elements or not. The evaluation unit 18 associates the photodiodes on which the light spot 14 is incident with a first processing region 16 which is shown hatched. In the example shown, the photodiodes with the indices (5; 3) to (7; 6) belong to this processing region. The other photodiodes 12 not shown hatched in FIG. 2 are associated with a second processing region.

The signals of the processing regions 16 are added and are supplied to a common amplifier in the evaluation unit 18. The signals of the other photodiodes are likewise added and supplied to a second amplifier. The signals amplified in these amplifiers are e.g. put into relationship. A value is determined in this manner which serves as a reference in monitoring operation.

During monitoring operation, the signals of the processing regions determined during the alignment phase are read out and are added and put into relationship in the same manner. A deviation from the values found during the alignment phase indicates an object in the monitored zone.

In another embodiment, e.g. only those photodiodes are read out on which the rim of the light spot 14 is incident, that is in the example shown the photodiodes with the indices (5; 3), (6; 3), (7; 3), (5; 4), (7; 4), (5; 5), (7; 5), (5; 6), (6; 6), (7; 6).

In a simpler process management, only the signals of a processing region are evaluated, that is, for example, of the photodiodes on which the light spot was incident during the alignment phase.

In a further aspect, the size of the light spot received is compared with an expected light spot size determined during the alignment phase.

To increase the security, the processing region which is supplied to a common evaluation can also be selected to be larger around the light spot to tolerate light displacements. For example, in the arrangement of FIG. 2, all photodiodes with the indices from (4; 2) to (8; 7) can also be associated with a common processing region.

In the embodiment shown, the light signals of the individual light emitting diodes 20 are imaged onto the respective corresponding spatially resolving light reception units 10 in the alignment phase and processing regions are respectively fixed in the described manner.

Provision can alternatively be made for the receiver module 28 not to include a plurality of spatially resolving light reception units 10, but rather to be made up of a light reception unit which can receive the light spots of a plurality of light emitting diodes 20. In such an embodiment, e.g. those photodiodes of the total receiver module 28 are combined to form a processing region on which the light spots of the light emitting diodes 20 are incident.

The individual evaluation units 19 or the total evaluation unit 18 can e.g. include a microprocessor or a correspondingly configured ASIC assembly.

It is also possible that the processing regions are selected such that one processing region is part of another processing region. Different acceptance regions of the light reception unit can thus be defined. A first processing region can thus e.g. correspond to an acceptance angle of 5 degrees, whereas a second processing region corresponds to an acceptance angle of 2.5 degrees and is optionally part of the first processing region. Depending on the demand, a larger or a smaller accuracy of the security system can also be set in this manner.

The evaluation effort in the optoelectronic security system in accordance with the invention is significantly reduced by the combination of individual parts of the spatially resolving light reception unit. Only two amplifiers are thus e.g. required for the further processing when two different processing regions are used.

The system in accordance with the invention is characterized by very large flexibility and ideal adaptability to the respective use and to the respective safety demands.

REFERENCE NUMERAL LIST 10 light reception unit
12 photodiode
14 light spot
16 first processing region
18 total reading out and evaluation unit
19 individual reading out and evaluation unit
20 light emitting diode
22 light transmission module
24 light ray
26 monitored zone
28 receiver module
40 summary unit
42 comparator device

The invention claimed is:

1. An optoelectronic security system for object detection in a monitored zone comprising:
   a plurality of tight transmitters in a light grid arrangement for a transmission of light signals into a monitored zone;
   at least one spatially resolving light reception unit for a reception of the light signals transmitted by the light transmitters, wherein the at least one spatially resolving light reception unit includes a one dimensional or two-dimensional photodiode matrix with light-sensitive elements, in particular charge-coupled device (CCD) elements, arranged in matrix form; and
   a read-out circuit for reading out signals of the at least one light reception unit, characterized by
   an evaluation device which is configured to split a surface of the at least one light reception unit into at least two processing regions in dependence on a predetermined selection criterion and to further process the signals of the at least two processing regions differently, wherein the read-out circuit is connected to the individual light-sensitive elements of the photodiode matrix for the reading out of the signals of the light-sensitive elements.

2. An optoelectronic security system in accordance with claim 1, characterized in that the evaluation unit is designed such that it can associate individual elements of the photodiode matrix with different processing regions.

3. An optoelectronic security system in accordance with claim 2, characterized in that the evaluation unit includes a summing unit which can add the signals of the elements of the photodiode matrix associated with a processing region to a region signal, in particular a current of individual photodiodes of the processing region to a total current.

4. An optoelectronic security system in accordance with claim 3, characterized in that the evaluation unit includes a comparator device for a comparison of region signals of individual processing regions with one another.

5. An optoelectronic security system in accordance with claim 1, characterized in that a separate spatially resolving light reception unit is associated with each light transmitter of the light grid arrangement.

6. An optoelectronic security system in accordance with claim 1, characterized in that a common spatially resolving light reception unit is associated with a plurality of light transmitters that includes up to all of the light transmitters of the light grid arrangement.

7. An alignment method for an optoelectronic security system for object detection in a monitored zone comprising
a plurality of light transmitters in a light grid arrangement for a transmission of light signals into a monitored zone;
at least one spatially resolving light reception unit for a reception of the light signals transmitted by the light transmitters, wherein the at least one spatially resolving light reception unit includes a one dimensional or two-dimensional photodiode matrix with light-sensitive elements, in particular charge-coupled device (CCD) elements, arranged in matrix form;
a read-out circuit for reading out of signals of the at least one light reception unit, wherein the read-out circuit is connected to the individual elements of the photodiode matrix for reading out of signals of the light-sensitive elements; and
an evaluation device which is configured to split a surface of the at least one light reception unit into at least two processing regions in dependence on a predetermined selection criterion and to further process signals of the at least two processing regions differently,
wherein light signals are transmitted to the at least one light reception unit during an alignment phase with the light transmitters of the light grid arrangement without interference objects in the monitored zone and different processing regions are fixed in dependence on a predetermined selection criterion, in particular at least one of a position of the light signals received at the light reception unit, a shape of the light signals received at the light reception unit, and a surface of the light signals received at the light reception unit.

8. An alignment method in accordance with claim 7, wherein such parts of a spatially resolving light reception unit are associated with a common processing region on which a light signal of a light transmission unit is incident.

9. An alignment method in accordance with claim 7, wherein such parts of a spatially resolving light receiver unit are associated with a common processing region which surround or bound a light signal received by a light transmission unit.

10. An alignment method in accordance with claim 7, wherein different processing regions are fixed such that the different processing regions correspond to different acceptance angles of the at least one light reception unit.

11. A method of operating an optoelectronic security system for object detection in a monitored zone comprising:
a plurality of light transmitters in a light grid arrangement for transmission of light signals into a monitored zone;
at least one spatially resolving light reception unit for reception of the light signals transmitted by the light transmitters, wherein the at least one spatially resolving light reception unit includes a one dimensional or two-dimensional photodiode matrix with light-sensitive elements, in particular charge-coupled device (CCD) elements, arranged in matrix form;
a read-out circuit for reading out of signals of the at least one light reception unit, wherein the read-out circuit is connected to individual elements of the photodiode matrix for the reading out of signals of the light-sensitive elements; and
an evaluation device which is configured to split a surface of the at least one light reception unit into at least two processing regions in dependence on a predetermined selection criterion and to further process signals of the at least two processing regions differently,
said optoelectronic security system having been aligned by transmitting light signals to the at least one light reception unit during an alignment phase with the light transmitters of the light grid arrangement without interference objects in the monitored zone and fixing different processing regions in dependence on a predetermined selection criterion, in particular at least one of a position of the light signals received at the light reception unit, a shape of the light signals received at the light reception unit and a surface of the light signals received at the light reception unit,
wherein light signals are transmitted into the monitored zone to the at least one spatially resolving reception unit during a monitoring phase with the light transmitters of the light grid arrangement.

12. A method in accordance with claim 11, wherein the light signals from respective processing regions are summed or integrated to form region signals of the respective processing regions.

13. A method in accordance with claim 12, wherein the region signals of individual ones of the respective processing regions are compared.

14. A method in accordance with claim 12, wherein relationships or differences of the region signals of individual ones of the respective processing regions are formed.

15. A method in accordance with claim 14, wherein the region signals are weighted before a ratio formation based on the relationships or before a difference formation based on the differences.

16. A method in accordance with claim 11, wherein a surface of a light spot is monitored at the least one light reception unit, said light spot being generated by incidence of a light signal.

17. A method in accordance with claim 11, wherein processing regions corresponding to different acceptance angles of the at least one light reception unit are monitored.

* * * * *

UNITED STATES PATENT AND TRADEMARK OFFICE
CERTIFICATE OF CORRECTION

| | |
|---|---|
| PATENT NO. | : 7,671,322 B2 |
| APPLICATION NO. | : 11/903803 |
| DATED | : March 2, 2010 |
| INVENTOR(S) | : Schmitz |

It is certified that error appears in the above-identified patent and that said Letters Patent is hereby corrected as shown below:

Column 6, Line 38     Delete "tight transmitters" and insert --light transmitters--

Column 8, Line 52     Insert --at-- after "the"

Signed and Sealed this

Thirtieth Day of November, 2010

David J. Kappos
*Director of the United States Patent and Trademark Office*